United States Patent
Ho et al.

(10) Patent No.: US 9,386,451 B2
(45) Date of Patent: Jul. 5, 2016

(54) MANAGING APPLICATION ACCESS TO CERTIFICATES AND KEYS

(71) Applicant: RESEARCH IN MOTION LIMITED, Waterloo (CA)

(72) Inventors: Alan Pak-Lun Ho, Mississauga (CA); Michael J. Mueller, Mississauga (CA); Eugene Chin, Mississauga (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/792,402

(22) Filed: Mar. 11, 2013

(65) Prior Publication Data

US 2014/0215634 A1    Jul. 31, 2014

Related U.S. Application Data

(60) Provisional application No. 61/757,989, filed on Jan. 29, 2013.

(51) Int. Cl.
| | |
|---|---|
| *H04L 29/06* | (2006.01) |
| *H04W 12/08* | (2009.01) |
| *G06F 21/10* | (2013.01) |
| *G06F 21/33* | (2013.01) |
| *G06F 21/62* | (2013.01) |

(52) U.S. Cl.
CPC .............. *H04W 12/08* (2013.01); *G06F 21/10* (2013.01); *G06F 21/33* (2013.01); *G06F 21/6209* (2013.01); *H04L 63/105* (2013.01); *H04L 63/123* (2013.01); *H04L 63/126* (2013.01)

(58) Field of Classification Search
CPC ........... G06F 21/10; G06F 8/30; G06F 21/72; G06F 21/629; G06F 21/604; G06F 21/6209; G06F 21/33; H04W 12/08; H04L 51/08; H04L 63/20

See application file for complete search history.

(56) References Cited

U.S. PATENT DOCUMENTS

| | | | |
|---|---|---|---|
| 4,945,556 | A | 7/1990 | Namekawa |
| 5,864,765 | A | 1/1999 | Barvesten |
| 5,987,440 | A | 11/1999 | O'Neil et al. |
| 5,987,611 | A | 11/1999 | Freund |
| 6,052,735 | A | 4/2000 | Ulrich et al. |
| 6,105,132 | A | 8/2000 | Fritch et al. |

(Continued)

FOREIGN PATENT DOCUMENTS

| | | |
|---|---|---|
| CN | 101523878 A | 9/2009 |
| EP | 0973350 A1 | 1/2000 |

(Continued)

OTHER PUBLICATIONS

Canadian Intellectual Property Office, "International Search Report", PCT/CA2013/050174, Sep. 24, 2013.

*Primary Examiner* — Carl Colin
*Assistant Examiner* — Ghodrat Jamshidi
(74) *Attorney, Agent, or Firm* — Ridout & Maybee LLP (57) ABSTRACT

Plural modes of operation, each associated with a class attribute, may be established on a mobile device. The present application discloses a method of handling an application launch request, a computing device for carrying out the method and a computer readable medium for adapting a processor to carry out the method. The method includes receiving a launch request identifying an application that is to be launched, acquiring an identity for the application, acquiring a class for the application, labeling the application with the identity and the class and launching the application.

15 Claims, 9 Drawing Sheets

(56) References Cited

U.S. PATENT DOCUMENTS

| | | |
|---|---|---|
| 6,233,446 B1 | 5/2001 | Do |
| 6,292,798 B1 | 9/2001 | Dockter et al. |
| 6,351,816 B1 | 2/2002 | Muller et al. |
| 6,360,322 B1 | 3/2002 | Grawrock |
| 6,405,202 B1 | 6/2002 | Britton et al. |
| 6,412,070 B1 | 6/2002 | Van Dyke et al. |
| 6,516,421 B1 | 2/2003 | Peters |
| 6,647,388 B2 | 11/2003 | Numao et al. |
| 6,668,323 B1 | 12/2003 | Challener et al. |
| 6,757,821 B1 | 6/2004 | Akiyama et al. |
| 6,772,350 B1 | 8/2004 | Belani et al. |
| 6,886,038 B1 | 4/2005 | Tabbara et al. |
| 6,896,183 B2* | 5/2005 | Takano .................. 235/380 |
| 6,957,330 B1 | 10/2005 | Hughes |
| 6,978,385 B1 | 12/2005 | Cheston et al. |
| 7,246,374 B1 | 7/2007 | Simon et al. |
| 7,305,562 B1 | 12/2007 | Bianco et al. |
| 7,331,058 B1 | 2/2008 | Gladney |
| 7,400,878 B2 | 7/2008 | Hassan et al. |
| 7,574,200 B2 | 8/2009 | Hassan et al. |
| 7,869,789 B2 | 1/2011 | Hassan et al. |
| 7,877,606 B2 | 1/2011 | Lapstun et al. |
| 8,074,078 B2 | 12/2011 | Brown et al. |
| 8,291,494 B1* | 10/2012 | Sallam et al. .............. 726/22 |
| 8,635,610 B2* | 1/2014 | Minari .................... 717/174 |
| 2001/0047485 A1 | 11/2001 | Brown et al. |
| 2002/0019944 A1 | 2/2002 | Kou |
| 2002/0031230 A1 | 3/2002 | Sweet et al. |
| 2002/0095414 A1 | 7/2002 | Barnett et al. |
| 2002/0095497 A1 | 7/2002 | Satagopan et al. |
| 2002/0112155 A1 | 8/2002 | Martherus et al. |
| 2003/0005317 A1 | 1/2003 | Audebert et al. |
| 2003/0065676 A1 | 4/2003 | Gbadegesin et al. |
| 2003/0093698 A1 | 5/2003 | Challener et al. |
| 2003/0120948 A1 | 6/2003 | Schmidt et al. |
| 2003/0126437 A1 | 7/2003 | Wheller et al. |
| 2003/0177389 A1 | 9/2003 | Albert et al. |
| 2004/0001101 A1 | 1/2004 | Trajkovic et al. |
| 2005/0154935 A1 | 7/2005 | Jin |
| 2006/0036654 A1* | 2/2006 | Abdallah et al. ............ 707/200 |
| 2006/0059556 A1 | 3/2006 | Royer |
| 2006/0070114 A1 | 3/2006 | Wood et al. |
| 2006/0129948 A1 | 6/2006 | Hamzy et al. |
| 2006/0156026 A1 | 7/2006 | Utin |
| 2006/0212589 A1 | 9/2006 | Hayer et al. |
| 2007/0073694 A1 | 3/2007 | Picault et al. |
| 2007/0277127 A1 | 11/2007 | Carlson et al. |
| 2008/0222711 A1 | 9/2008 | Michaelis |
| 2008/0318616 A1* | 12/2008 | Chipalkatti et al. ....... 455/550.1 |
| 2010/0319053 A1 | 12/2010 | Gharabally |
| 2011/0145833 A1 | 6/2011 | De Los Reyes et al. |
| 2011/0197285 A1 | 8/2011 | Ginter et al. |
| 2011/0238496 A1* | 9/2011 | Gurbuxani et al. ........ 705/14.49 |
| 2011/0296440 A1 | 12/2011 | Laurich et al. |
| 2011/0307745 A1* | 12/2011 | McCune et al. ............... 714/54 |
| 2011/0314467 A1 | 12/2011 | Pearson |
| 2012/0011373 A1 | 1/2012 | Hakkarainen et al. |
| 2012/0054853 A1 | 3/2012 | Gupta et al. |
| 2012/0202527 A1 | 8/2012 | Obradovich et al. |
| 2013/0124866 A1* | 5/2013 | Farrugia et al. ............. 713/171 |
| 2013/0332981 A1* | 12/2013 | Paris et al. ..................... 726/1 |

FOREIGN PATENT DOCUMENTS

| | | |
|---|---|---|
| WO | 0059225 | 10/2000 |
| WO | 2005045550 A2 | 5/2005 |

* cited by examiner

MANAGING APPLICATION ACCESS TO CERTIFICATES AND KEYS

CROSS-REFERENCE TO RELATED APPLICATIONS

The present application claims priority to U.S. Provisional Patent Application No. 61/757,989, filed Jan. 29, 2013, the contents of which are incorporated herein by reference.

FIELD

The present application relates generally to management of digital identity certificates and cryptographic keys and, more specifically, to managing application access to certificates and keys.

BACKGROUND

Mobile devices are used for a variety of purposes. Users may wish to use a particular mobile device for personal applications such as games, reading news distributed using really simple syndication (RSS), web browsing and general leisure. Corporations may want the same mobile device to be used for a subset of functionality required for a user to complete their job.

However, when a mobile device is used for both corporate and personal matters, a corporation may choose to limit the risk of exposure of data on the mobile device. This may be done, for example, through the implementation of information technology (IT) policies on the mobile device. Such policies sometimes lead to a poor user experience, as the mobile device may be locked such that no new applications may be loaded onto the mobile device. Alternatively, the mobile device may be restricted regarding which non-work-related applications may be loaded onto the device. For example, an IT policy on the mobile device may, in an effort to prevent potential spread of viruses, prohibit the user of the mobile device from downloading software from any location other than a specifically approved location. In this manner, the range of applications that the user can install may be significantly limited.

BRIEF DESCRIPTION OF THE DRAWINGS

Reference will now be made, by way of example, to the accompanying drawings which show example implementations; and in which.

DETAILED DESCRIPTION

Rather than restricting access to an entire mobile device that is used for both personal and corporate functionality, the present disclosure contemplates the creation of dual or plural modes of operations on the mobile device. In particular, each application of a plurality of applications may be segregated into one of a plurality of groups. In an example scenario involving a corporate mode of operation and a personal mode of operation, applications can be designated as either corporate applications or personal applications. In some cases, where an application may be both corporate and personal, a copy of the application code can be saved in both a personal memory space and a corporate memory space on the mobile device.

The present disclosure provides for a mobile device, but is not meant to be limited to any particular mobile device. Examples of mobile devices include smart phones, personal digital assistants, data-enabled cellular telephones, tablet computers, among others.

The mobile device in the present disclosure implements an IT policy to control corporate data. This may be done by connection to an enterprise server, which provides the IT policy for the device. In other embodiments, the IT policy may be implemented on a per device basis individually.

Notably, the segregation of applications discussed hereinbefore may have far-reaching implications for management of security aspects of the mobile device. For example, public and private cryptographic keys may be saved in memory in such a manner that the keys are associated with the mobile device and not with a mode of operation of the mobile device. Similarly, digital identity certificates may be saved in memory in such a manner that the identity certificates are associated with a user of the mobile device and not with a mode of operation of the mobile device.

Before launching an application, the application may be labeled with an identity attribute and a class attribute. The class attribute may be associated with a mode of operation. The application's identity and class may then be taken into consideration when processing an application's request to access a store or create a new store.

According to an aspect of the present disclosure, there is provided a method of handling an application launch request. The method comprises receiving a launch request identifying an application that is to be launched, acquiring an identity for the application, acquiring a class for the application, labeling the application with the identity and the class and launching the application. In other aspects of the present application, a mobile communication device with a processor is provided for carrying out this method and a computer readable medium is provided for adapting a processor in a mobile communication device to carry out this method.

According to another aspect of the present disclosure, there is provided a method of handling attempted access to a store in a memory of a device. The method comprises receiving, from an application, a request for access to a store, detecting an identity for the application, detecting a class for the application, determining whether the application can access the store and based on the determining, processing the request. In other aspects of the present application, a mobile communication device with a processor is provided for carrying out this method and a computer readable medium is provided for adapting a processor in a mobile communication device to carry out this method.

According to a further aspect of the present disclosure, there is provided a method of handling creation of a store in a memory of a device. The method comprises receiving, from an application, a request to create a store, detecting an identity for the application, detecting a class for the application, creating conditions to access the store, the creating based on the identity and the class and creating the store with the conditions. In other aspects of the present application, a mobile communication device with a processor is provided for carrying out this method and a computer readable medium is provided for adapting a processor in a mobile communication device to carry out this method.

Other aspects and features of the present disclosure will become apparent to those of ordinary skill in the art upon review of the following description of specific implementations of the disclosure in conjunction with the accompanying figures.

Figure 1:
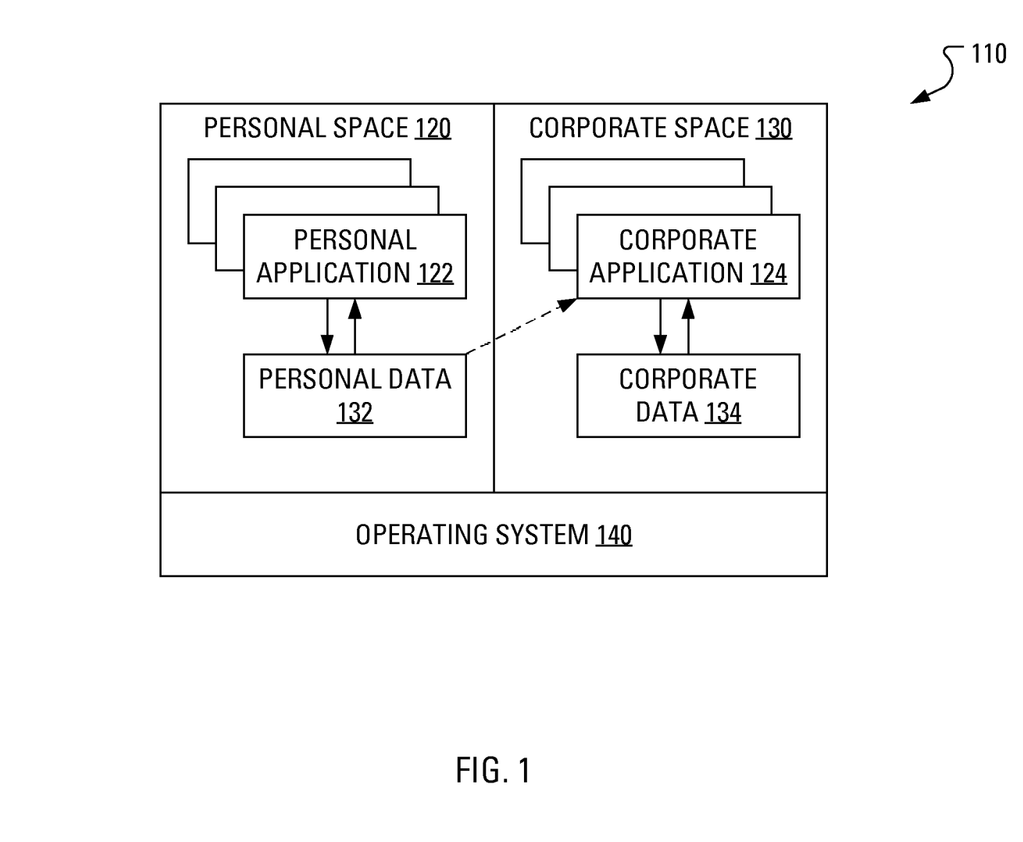
FIG. 1 illustrates a memory segregated into plural spaces.

Reference is now made to FIG. 1, which shows a block diagram of a memory 110 of a mobile device. The memory 110 is configured to maintain executable code for various applications and data related to the operation of the various applications, such combination of code and data being referred to herein as an "application space". As illustrated in the example of FIG. 1, the memory 110 is divided into a personal space 120 and a corporate space 130.

The corporate space 130 generally comprises a portion of memory on the mobile device segregated for data, applications, or both. The data and/or applications may be considered sensitive to a business, corporation, enterprise, government, non-profit organization, user of the device or any other entity responsible for the setting of an IT policy for the mobile device.

The personal space 120 generally comprises a portion of memory segregated for "personal" applications and data, where such applications or data may be considered outside of, or separate from, those applications that are subject to an IT policy.

An application 122 executed from code saved within the personal space 120 may access data 124 that is also saved within the personal space 120. The data 124 that is saved within the personal space 120 may be considered to be personal data.

Similarly, an application 132 executed from code saved within the corporate space 130 may access data 134 that is also saved within the corporate space 130. The data 134 that is saved within the corporate space 130 may be considered to be corporate data.

By segregating corporate applications from personal applications and data associated with each, a corporate IT policy may be implemented on the mobile device for the corporate data, thereby protecting the data, while still allowing for personal applications and personal data on the device. This provides more flexibility to a user of the mobile device and an arguably better user experience.

An operating system 140 enforces the segregation of the data as described in more detail below.

The designation of each application loaded onto the mobile device as either a personal application or a corporate application may be done in several ways. In one embodiment, a corporate IT policy can be set for the loading of applications onto the mobile device, where certain specified applications are designated by the IT policy to be on a list of corporate applications. Other applications, which are not the list of corporate applications, could be considered, by default, to be personal applications. In other embodiments, a user, administrator, carrier or other entity can use a configuration program or a navigation entity (application launcher) to designate the various applications on the device as either a personal application or a corporate application. Further, signatures applied to applications could also be used for making a distinction between personal applications and corporate applications. Other examples of the designation of applications as corporate and personal would be apparent to those skilled in the art having the benefit of the present disclosure.

In further embodiments, hybrid applications, which have both personal and corporate uses, could be duplicated between the corporate space 130 and the personal space 120. In this way, if a user wants to use a particular application for personal reasons, the user could execute the application code 122 that is saved in the personal space 120. Conversely, if the user wants to use the same application for corporate purposes, the user could execute the application code 132 that is saved in the corporate space 130.

Thus, for example, one copy of the code for a document editor could be saved in the personal space 120 and another copy of the code for the document editor could be saved in the corporate space 130, thereby allowing the editing of both personal documents and corporate documents, while maintaining security for the corporate data 134.

In one embodiment, the corporate applications 132 may be provided with additional security over the personal applications 122. For example, before allowing one of the corporate applications 132 to be launched, the operating system 140 may prompt the user to provide authentication, e.g., the operating system 140 may prompt the user to enter a password and the operating system 140 may authenticate the password. Further, inactivity timers could be implemented, such that the corporate applications 132 may be locked after a period of inactivity, while leaving the personal applications 122 unlocked. The operating system 140 may require a user to enter a password to unlock a locked corporate application 132 so that the corporate data 134 related to the corporate application 132 may be accessed.

The designation (e.g., "personal" or "corporate") of a given application may further limit the data to which the given application has access. Thus, for example, the corporate applications 132 may execute in their own mode in which mode any data that is written by the corporate applications 132 may not be accessed by the personal applications 122. The limitation would be that personal applications 122 are not able to read corporate data 134, nor is a corporate application capable of writing to personal data 124.

Similarly, a given personal application 122 may not be able to write to the corporate data 134. In some embodiments, the corporate applications 132 may not be able to read the personal data 124. In other embodiments, the corporate applications 132 may be able to read the personal data 124.

The corporate data 134 may be encrypted for security.

The corporate data 134 may also have date of deletion policies in effect on the mobile device. Thus, if a subset of the corporate data 134 is not accessed within a certain time period, a date of deletion policy may dictate that the subset is to be erased. The date of deletion policy may be pursuant to a corporate data reaping timeline. For example, if data is not accessed on the mobile or computing device for seven days, the data may be deleted from the mobile device. The user would then need to download the data again if the data was required for the mobile device. This may be implemented through tags or data tables associated with the data.

The operating system 140 may handle the enforcement of the above differentiating rules between the corporate space 130 and the personal space 120. For example, the operating system 140 may implement data access for the various applications 122 and 132, where each application is given a group permission, similar to UNIX group permissions. In other embodiments, other user permission or other permission system may also be used. Data is further designated in files that allow access by certain groups. Thus, the operating system 140 may allow the corporate data 134 to be accessed only by the corporate applications 132 that have group permissions to access such data. Similarly, the personal data 124 may be written to or read only by the personal applications 122 based on the group permissions of the personal applications 122 with regard to the personal data 124. The corporate applications 132, however, may not have group permissions to write to the personal data 124 in one embodiment, as enforced by the operating system 140.

As shown by a dashed line with an arrow tip in FIG. 1, the personal data 124 may have some form of public permissions that would allow the corporate applications 132 to read the personal data 124.

Access to the data may be maintained for other data functionalities, thereby preventing the corporate data 134 from being accessed in the personal mode. For example, copy or cut functionality may be managed between the personal mode and corporate mode. Potentially, no cutting or copying would be allowed in the corporate mode of operation by the corporate applications 132.

In other embodiments, cutting and copying may be allowed between corporate applications but may be restricted when trying to paste outside corporate mode. As will be appreciated, this could again be managed by a UNIX group permission type model using the operating system 140. When cutting or copying various text or images, or other data, a new data file is created which could have group permissions that would restrict where the pasting of that file is allowed to occur. Thus, when using a personal application, if trying to paste corporate data, an error might be returned, or the paste operation may simply not function.

In one embodiment, the corporate data 134 may be provided to a mobile device based on a secure connection with the corporate network. For example, this may be done through a virtual private network or other secure connection to an enterprise server.

Further, in one embodiment, the memory 110 may be located on a mobile device. In this case, the mobile device may have a pre-established secure connection with an enterprise server.

Figure 2:
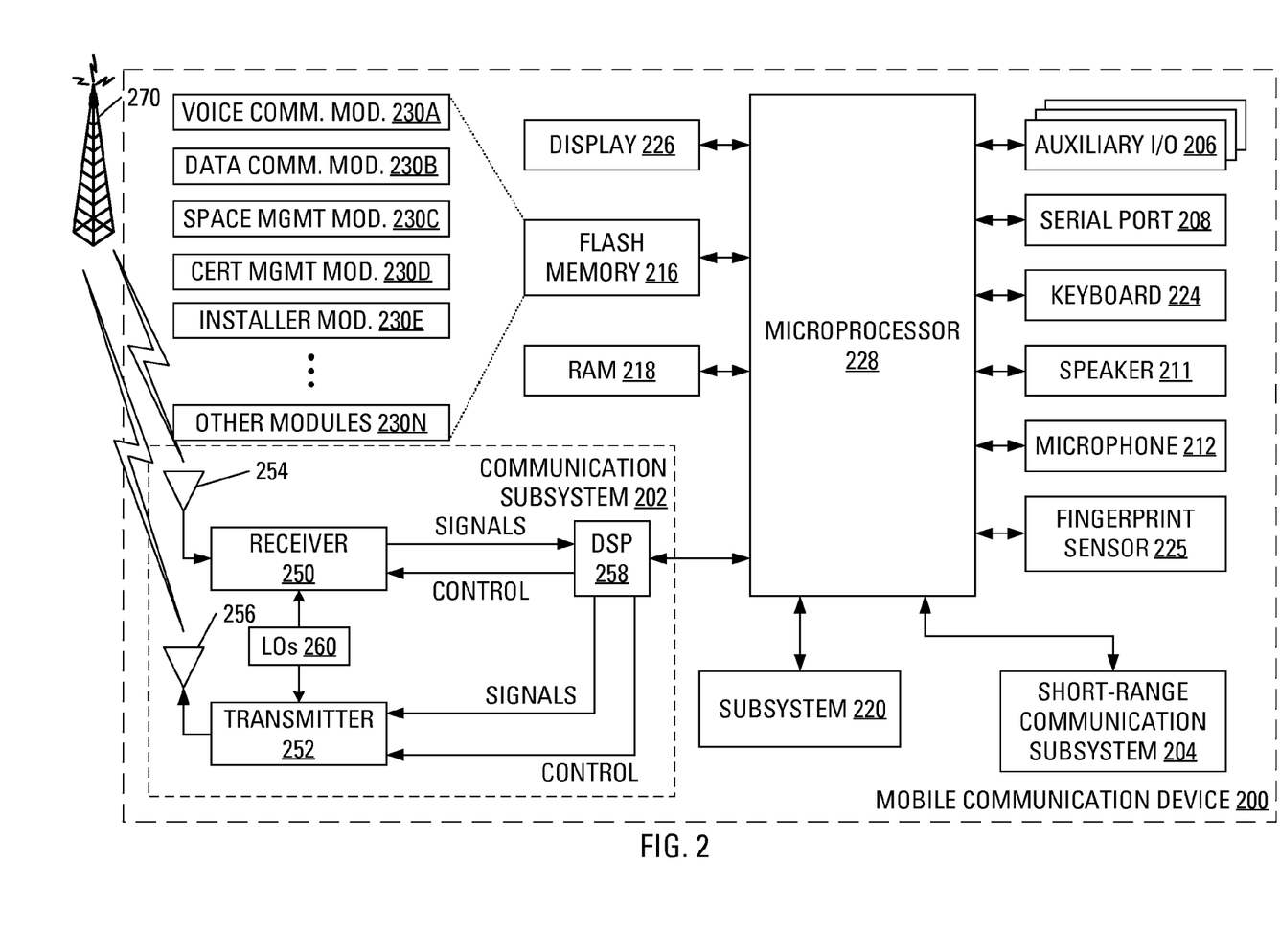
FIG. 2 illustrates a mobile communication device with memory that may be segregated as illustrated in FIG. 1.

FIG. 2 illustrates a mobile communication device 200 as an example of a device that may include the memory 110 of FIG. 1. The mobile communication device 200 includes a housing, an input device (e.g., a keyboard 224 having a plurality of keys) and an output device (e.g., a display 226), which may comprise a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the mobile communication device 200, in part, responsive to actuation of the keys on the keyboard 224 by a user.

The housing may be elongated vertically, or may take on other sizes and shapes (including clamshell housing structures). In the case in which the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the mobile communication device 200 are shown schematically in FIG. 2. These may include a communications subsystem 202, a short-range communications subsystem 204, the keyboard 224 and the display 226. The mobile communication device 200 may further include other input/output devices, such as a set of auxiliary I/O devices 206, a serial port 208, a speaker 211 and a microphone 212. The mobile communication device 200 may further include memory devices including a flash memory 216 and a Random Access Memory (RAM) 218 and various other device subsystems 220. The mobile communication device 200 may comprise a two-way radio frequency (RF) communication device having voice and data communication capabilities. In addition, the mobile communication device 200 may have the capability to communicate with other computer systems via the Internet.

The memory 110 of FIG. 1 may be implemented in a combination of the flash memory 216 and the RAM 218.

Operating system software executed by the microprocessor 228 may be saved in a computer readable medium, such as the flash memory 216, but may be saved in other types of memory devices, such as a read only memory (ROM) or similar storage element. In addition, system software, specific device applications, or parts thereof, may be temporarily loaded into a volatile store, such as the RAM 218. Communication signals received by the mobile device may also be saved to the RAM 218.

The microprocessor 228, in addition to its operating system functions, enables execution of software applications on the mobile communication device 200. A predetermined set of software applications that control basic device operations, such as a voice communications module 230A and a data communications module 230B, may be installed on the mobile communication device 200 during manufacture. A space management module 230C, a certificate manager 230D and an installer module 230E may also be installed on the mobile communication device 200 during manufacture, to implement aspects of the present disclosure. As well, additional software modules, illustrated as an other software module 230N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items saved or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the mobile communication device 200 is intended to operate. For example, the communication subsystem 202 of the mobile communication device 200 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the mobile communication device 200.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the mobile communication device 200 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the mobile communication device 200. In addition, the display 226 may also be utilized in voice communication mode, for example, to display the identity of a calling party, the duration of a voice call, or other voice call related information.

The short-range communications subsystem 204 enables communication between the mobile communication device 200 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication module, etc.

The mobile communication device 200 may generate cryptographic keys for use in a public key infrastructure (PKI) scheme. In a PKI scheme, a device generates a public cryptographic key (public key) and a corresponding private cryptographic key (private key). However, such cryptographic keys are of little use unless the public key is reliably associated with the identity of the mobile communication device 200, or the identity of the user of the mobile communication device 200.

A public key certificate (or digital identity certificate) is an electronic document, issued by a trusted party. The public key certificate incorporates a digital signature to bind together a public key with an identity—information such as the name of a person or an organization, an associated address and so forth. The certificate can be used to verify that a public key belongs to an individual.

A Certificate Authority (CA) may act as the trusted party, the entity that issues digital certificates. The digital certificate certifies the ownership of a public key by the named subject of the digital certificate.

Upon receiving a communication and an associated signature, the microprocessor 228 of the mobile communication device 200 may act to authenticate the communication. The microprocessor 228 may generate a hash of the communication. The microprocessor 228 may also decrypt the signature using a public key associated with the source of the communication. Upon matching the decrypted signature to the generated hash of the communication, the microprocessor 228 may consider the communication to have reliably originated at the source.

When the microprocessor 228 requires the public key associated with the source of the communication, the microprocessor 228 may review a local key store. Upon failing to locate the public key in the local key store, the microprocessor 228 may seeks to import a digital certificate associated with the source of the communication. The microprocessor 228 may obtain the digital certificate directly from the source of the communication or from a trusted CA. Upon obtaining the digital certificate, the microprocessor 228 may save the digital certificate at the mobile communication device 200 in a certificate store. Furthermore, the microprocessor 228 may extract the public key from the digital certificate and save the public key in a key store.

Historically, certificate stores and key stores have been implemented independent of the concept of the mobile communication device 200 having distinct modes of operation and corresponding memory spaces.

In aspects of the present application, a "class" designation may be used within the existing certificate store structure and key store structure. Accordingly, individual certificates and keys can be assigned to one space among plural spaces. In operation, the microprocessor 228 may consider a class of a certificate when importing the certificate, validating the certificate and deleting the certificate. Similarly, the microprocessor 228 may consider a class of a key when importing the key and when deleting the key.

The space management module 230C, executed by the microprocessor 228, may be configured to handle such tasks as space creation and space removal.

Figure 3:
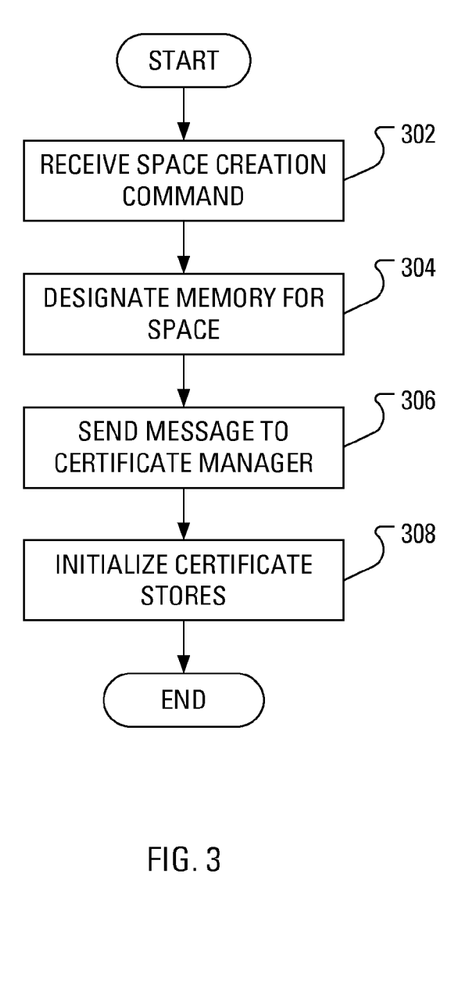
FIG. 3 illustrates example steps in a method of creating a segregated space in a memory as illustrated in FIG. 1.

FIG. 3 illustrates example steps in a method of creating a space. Initially, the space management module 230C may receive (step 302) a command to create a personal space. Responsively, the space management module 230C may designate (step 304) a range of addresses in the memory 110 for the personal space 120. The space management module 230C may send (step 306) inter-process messages to the certificate manager 230D to indicate that the personal certificate stores are to be initialized for the personal space 120. The certificate manager 230D may then initialize (step 308) one or more personal certificate stores, that is, ranges of memory in which to save certificates. For example, a personal certificate store may be created for certificates related to the browsing, by the mobile communication device 200, of the world wide web. For another example, a personal certificate store may be created for certificates related to use, by the mobile communication device 200, of WiFi networks. For a further example, a personal certificate store may be created for certificates related to use, by the mobile communication device 200, of Virtual Private Networks (VPNs).

The same method may be repeated for the corporate space. Similarly, the method illustrated in FIG. 3 can be used to create a personal key store or a corporate key store.

Initially, the space management module 230C may receive (step 302) a command to create a corporate space. Responsively, the space management module 230C may designate (step 304) a range of addresses in the memory 110 for the corporate space 130. The space management module 230C may send (step 306) inter-process messages to the certificate manager 230D to indicate that the corporate certificate stores are to be initialized for the corporate space 120. The certificate manager 230D may then initialize (step 308) one or more corporate certificate stores. For example, a corporate certificate store may be created for certificates related to the browsing, by the mobile communication device 200, of the world wide web. For another example, a corporate certificate store may be created for certificates related to use, by the mobile communication device 200, of WiFi networks. For a further example, a corporate certificate store may be created for certificates related to use, by the mobile communication device 200, of Virtual Private Networks (VPNs).

Hereinbefore, creation (step 308) of a certificate store associated with the designation of a class has been presented in the context of creation of a space associated with the designation of the same class (e.g., corporate). Notably, however, a certificate store may be created independent of the creation of a space and responsive to a command to create a certificate store.

Figure 4:
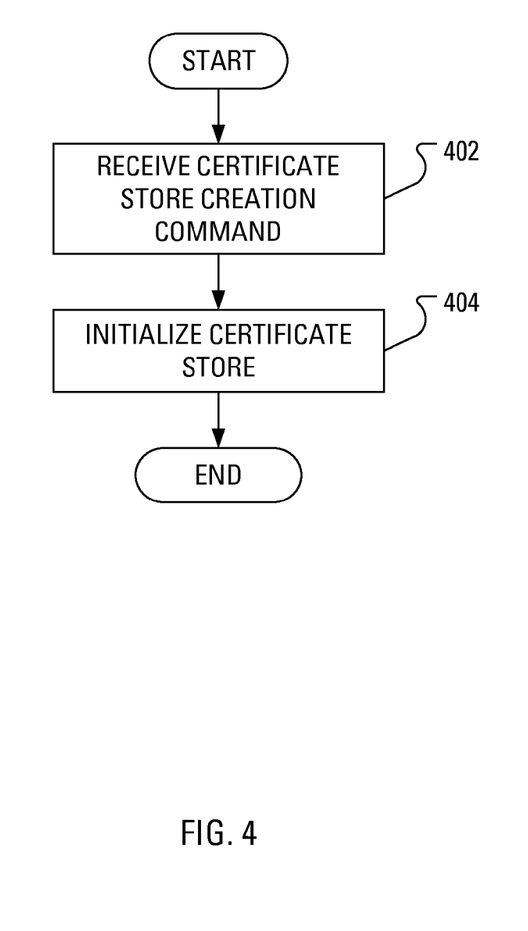
FIG. 4 illustrates example steps in a method of creating a certificate store.

FIG. 4 illustrates example steps in a method of creating a certificate store. Some time subsequent to the creation of a space associated with the designation of a class, the certificate manager 230D may receive (step 402) a command (say, in the form of an inter-process message) to create a certificate store. Based on the command indicating a class for the certificate store, the certificate manager 230D may proceed to create (step 404) a certificate store associated with a designation of the class (corporate or personal).

Figure 5:
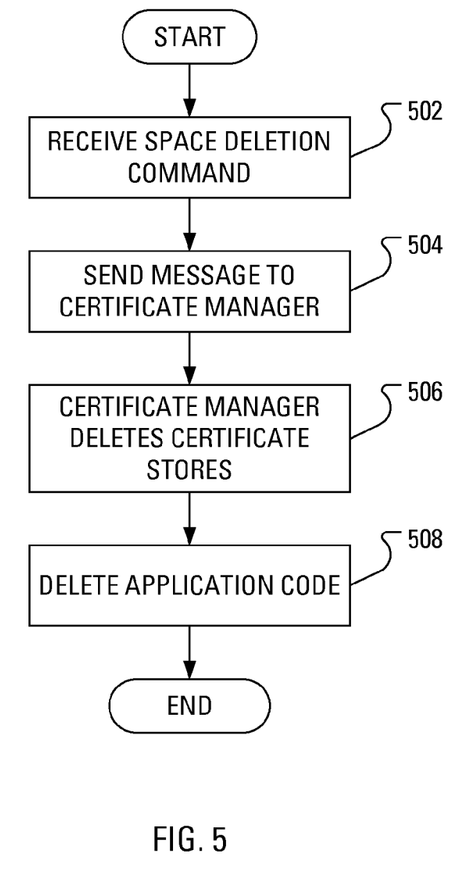
FIG. 5 illustrates example steps in a method of deleting a segregated space in a memory as illustrated in FIG. 1.

FIG. 5 illustrates example steps in a method of deleting a space. Initially, the space management module 230C may receive (step 502) a command to delete the corporate space 130. Responsively, the space management module 230C may send (step 504) inter-process messages to the certificate manager 230D to indicate that the corporate certificate stores are to be deleted. The certificate manager 230D may delete (step 506) the one or more corporate certificate stores. More specifically, there may exist Application Programming Interfaces (APIs) specific to each mobile device activity that is associated with a certificate store. Recalling previous examples, there may be an API specific to web browsing, an API specific to WiFi use and an API specific to VPN use. A call to one of these APIs to delete a corporate certificate store may indicate specific attributes for each of the corporate certificate stores to be deleted. Such attributes may specify that the certificate store has a corporate class designation, is associated with a specific owner and has specific a group ID attribute.

Similarly, responsive to receiving (step 502) a command to delete a space of a particular class, the space management module 230C may send (step 504) inter-process messages to the certificate manager 230D to indicate that corporate key stores are to be deleted. The certificate manager 230D may then delete one or more key stores of the same class.

The space management module 230C may also delete (step 508) the corporate applications 132.

Notably, the deletion (step 506) of the one or more corporate certificate stores, by the certificate manager 230D may occur without messaging between the space management module 230C and the certificate manager 230D. In such a case, the space management module 230C merely receives (step 502) a command to delete a space of a particular class and, responsively, deletes (step 508) the applications of the particular class.

The certificate manager 230D, as part of the operating system 140, may occasionally be called upon by a given application, among the applications 122, 132, to verify the validity of a certificate. For example, the certificate manager 230D may receive (step 602, see FIG. 6) a certificate validation command when the given application, executed on the mobile communication device 200, has received a certificate from a source of a communication.

Figure 6:
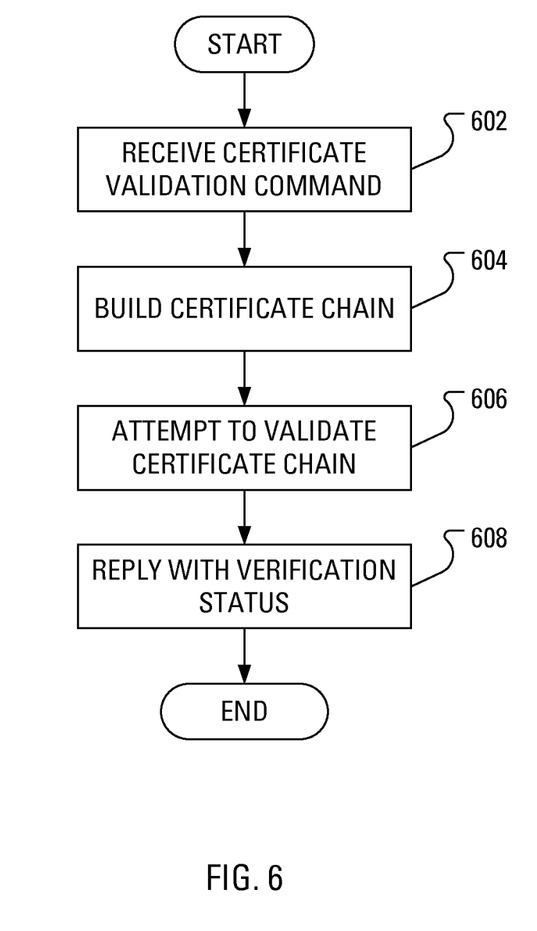
FIG. 6 illustrates example steps in a method of handling a certificate validation request.

In typical operation, it is expected that the certificate manager 230D will build (step 604) a certificate chain for the received certificate. The received certificate is expected to indicate an issuing CA. The issuing CA may be trusted based on a certificate issued by a further CA, and so on, ending at a so-called "root" CA certificate. Having built the chain, the certificate manager 230D attempts to validate (step 606) the chain by determining that the root CA is saved in one of the trusted certificate stores for the given application and is explicitly trusted. Upon determining that the root CA certificate for the received certificate is saved in one of the trusted certificate stores, the certificate manager 230D may reply (step 608) to the given application from which the certificate validation command was received with an indication of a validation status. As will be familiar to those skilled in the art, the indication may include a message indicating successful validation or a message indicating unsuccessful validation.

The certificate manager 230D will typically attempt to validate (step 606) the chain by locating the root CA certificate in any one of the trusted certificate stores, without regard for whether a particular certificate store is a corporate certificate store or a personal certificate store. This could lead to a situation where the given application, running in the corporate space 130, may cause the certificate manager 230D to successfully validate (step 606) a chain based on a root CA certificate that is explicitly trusted in a personal certificate store but not specifically trusted in one of the corporate certificate stores.

The certificate validation command created by the given application may specify one or more certificate stores. As one solution, the certificate manager API may be altered such that, for example, certificate manager 230D may only validate (step 606) a chain based on a root CA certificate in a specific personal certificate store, thereby leading to validation of the certificate with a root CA certificate trusted in the personal space 120. The certificate manager 230D may, for another example, only validate (step 606) a chain based on a root CA certificate in a specific corporate certificate store, thereby leading to validation of the certificate with a root CA certificate trusted in the corporate space 130. If the certificate store is not specified, then the certificate manager 230D may validate (step 606) a chain based on a root CA certificate in a personal certificate store or a corporate certificate store, thereby leading to validation of the certificate with either a root CA certificate trusted in the personal space 120 or a root CA certificate trusted in the corporate space 130.

As mentioned hereinbefore, the certificate validation command created by the given application may specify multiple certificate stores. However, it is noted that all of the certificate stores will be in the same space. In such a case, the certificate manager 230D may attempt to validate (step 606) a chain against root CA certificates in all of the multiple certificate stores.

With memory arranged in spaces as described herein, some care may be exercised when launching applications and allowing applications to import and use certificates, while also restricting access to these certificates. Access control for a given application may take into account the identity of application and the class of the application.

The identity of an application is unique and is assigned to the application before launch. In the case of an installed application, the identity of the application may be assigned by the installer module 230E (see FIG. 2) executed by the microprocessor 228. In the case of a system service application that comes pre-installed on a device, the identity of the system service application may be assigned by the device manufacturer during development.

The class of an application may be assigned, at the time of launching the application, by a class manager. The class manager may, for example, select a class based on user interactions that lead to the launching of the application. For example, the user may cause an application to launch while working within the corporate mode of operation and, accordingly, select the corporate class. Certain system service applications may be assigned one or more classes. The function of a class manager may be carried out by the space management module 230C. Alternatively, a distinct class management module may be executed by the microprocessor 228 to handle class manager functions. Such a class management module may be among the other modules 230N illustrated in FIG. 2.

Enforcing application access to certificates may be accomplished by enforcing application access to certificate stores. A given application may be provided with a store namespace; only those stores to which the given application has access are visible to the given application. An application's identity and class may be detected at the time of a certificate-operation request and the request may be handled based on the visible store namespace.

Figure 7:
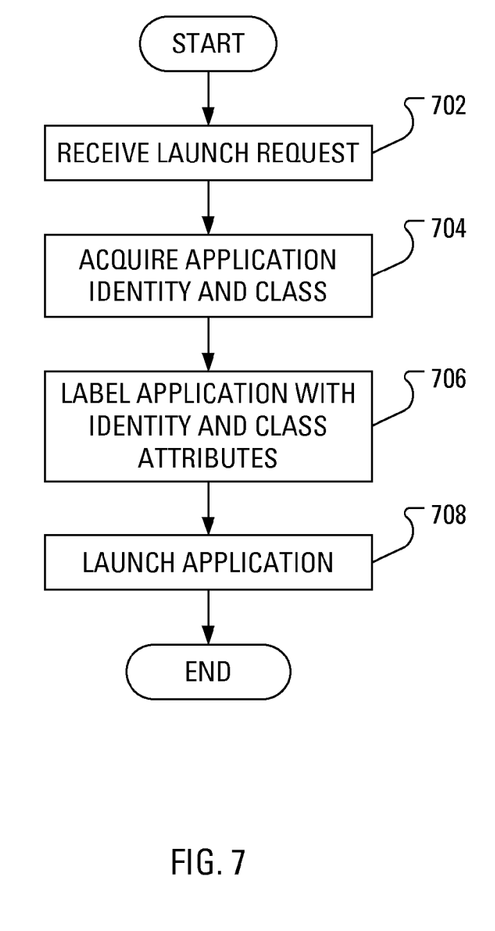
FIG. 7 illustrates example steps in a method of handling an application launch request.

FIG. 7 illustrates example steps in a method of handling an application launch request, which method may be carried out by an application launcher executed, for example, by the microprocessor 228. The method begins with the application launcher receiving (step 702) a launch request identifying a particular application that is to be launched.

The application launcher acquires (step 704) an identity and a class for the application that is to be launched. Indeed, the application launcher may extract the identity for the application from the launch request. Similarly, the application launcher may extract the class for the application from the launch request.

Upon acquiring (step 704) an identity and a class for the application that is to be launched, the application launcher may label (step 706) the application that is to be launched with an identity attribute and a class attribute. The application launcher may then launch (step 708) the application.

Figure 8:
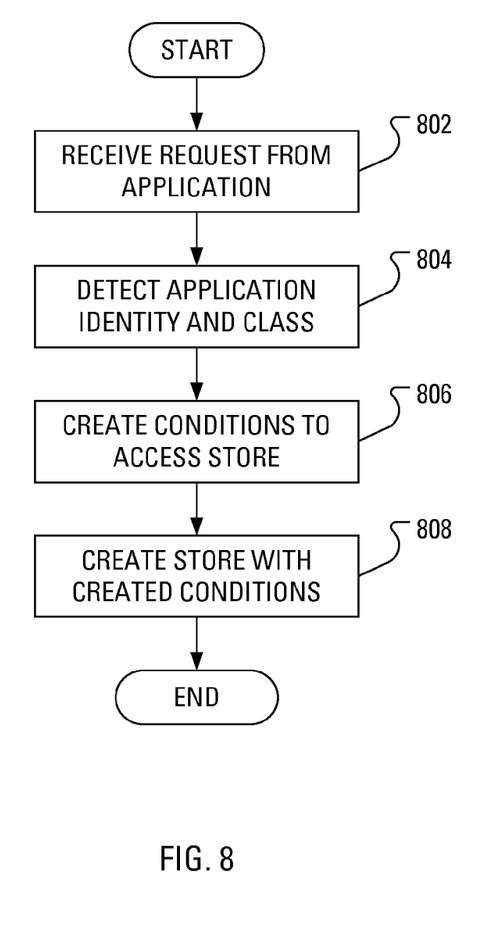
FIG. 8 illustrates example steps in a method of handling a request from an application to create a certificate store.

FIG. 8 illustrates example steps in a method of handling a request from an application to create a certificate store. The method may be carried out by, for example, the certificate manager 230D. Initially, the certificate manager 230D may receive (step 802) a request from an application to create a certificate store. Responsive to receiving the request, the certificate manager 230D may detect (step 804) the identity and class attached to the application. Based on the identity and class detected as being attached to the application, the certificate manager 230D may create (step 806) conditions for accessing the certificate store. The certificate manager 230D may then create (step 808) the requested store. As a part of creating (step 808) the requested store, the certificate manager 230D may attach the access conditions created in step 806.

Example conditions that may be attached to a store may be based on whitelists. One or more identities (applications) may be granted access, with the "owner" (the application that created the store) always having read/write access. Each application, as identified by its identity or identity group, may be granted either read-only or read/write access. One example for an identity group may be a list of identities of applications. Another example for an identity group may be all applications of a certain class. A further example for an identity group may be all applications. The latter example may employ a wildcard character.

The read-only and read/write whitelists are properties of a given store, created and updated by the owner application, implicitly or explicitly, and are always present. An application, without knowledge of other applications, that just wants a store may create a store with only its own identity added to the read/write whitelist.

A list of all stores to which a given application has access may be called a "namespace" for the given application. Stores that are accessible by multiple applications will appear in multiple namespaces. Stores that are accessible by only a single application will appear in only one namespace.

Figure 9:
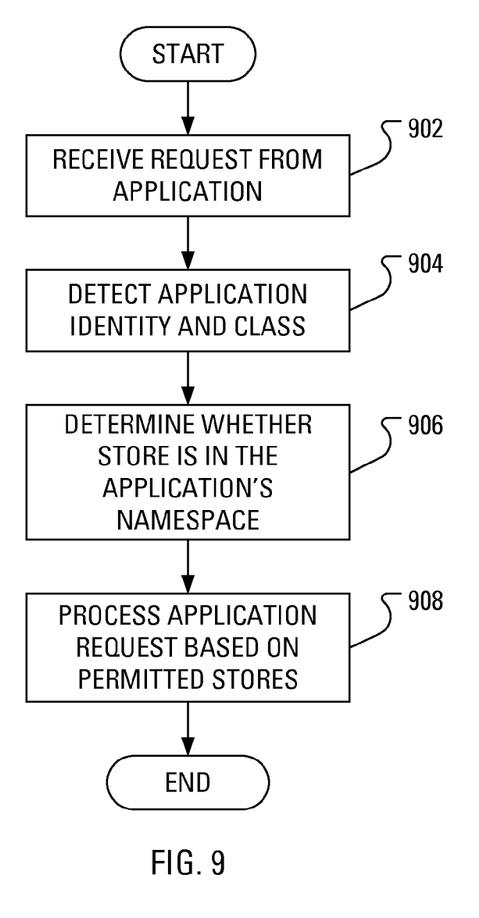
FIG. 9 illustrates example steps in a method of handling a request from an application for access to a certificate store.

FIG. 9 illustrates example steps in a method of handling a request from an application for access to a certificate store. The method may be carried out by, for example, the certificate manager 230D. Initially, the certificate manager 230D may receive (step 902) a request from an application for access to a certificate store. Responsive to receiving the request, the certificate manager 230D may detect (step 904) the identity and class attached to the application. Once the certificate manager 230D has detected the identity and class attached to the application, the certificate manager 230D may determine (step 906) whether the certificate store is in the application's namespace. The certificate manager 230D may then process (step 908) the request based on the determining.

For example, if the application has requested access to a certificate store that is in the namespace of the application, processing (step 908) the request may involve the certificate manager 230D allowing the application access to the certificate store. Furthermore, processing (step 908) the request may involve carrying out the request. However, if the application has requested access to a certificate store that is not in the namespace of the application, processing (step 908) the request may involve the certificate manager 230D denying the application access to the certificate store.

The descriptions of the methods whose example steps are illustrated in FIGS. 8 and 9 reference certificate stores specifically. It should be clear that access to key stores may be managed in a similar manner. Indeed, there may be stores for data items that are neither certificates nor keys, and yet the methods described hereinbefore may be applied.

Conveniently, designation of a class for certificates and keys allows for specific spaces to be associated with distinct certificate stores and keys stores, thereby allowing for space-aware import, validation and deletion of certificates and keys. As described hereinbefore, validation does not cross space boundaries. Furthermore, on deletion of a space, associated certificates are also deleted.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of handling attempted access to a store in a memory of a device, the method comprising:
   receiving, at a computing device, from an application, a request for access to the store;
   detecting an identity attribute for the application;
   detecting a class attribute for the application, wherein the class attribute for the application is associated with a mode of operation of the device;
   basing a namespace of the application on the identity attribute for the application and the class attribute for the application;
   determining that the application can access the store, wherein the determining that the application can access the store comprises determining that the store is in the namespace of the application; and
   based on the determining, processing the request.

2. The method of claim 1 wherein the store comprises a certificate store.

3. The method of claim 1 wherein the store comprises a cryptographic key store.

4. The method of claim 1 wherein the processing comprises allowing the application access to the store.

5. The method of claim 4 wherein the processing comprises carrying out the request.

6. A computing device comprising:
   a memory;
   a processor adapted to:
   receive, from an application, a request for access to a store;
   detect an identity attribute for the application;
   detect a class attribute for the application, wherein the class attribute for the application is associated with a mode of operation of the computing device;
   base a namespace of the application on the identity attribute for the application and the class attribute for the application;
   determine that the application can access the store, wherein to determine that the application can access the store, the processor is adapted to determine that the store is in the namespace of the application; and
   process the request based on the determining.

7. The computing device of claim 6 wherein the store comprises a certificate store.

8. The computing device of claim 6 wherein the store comprises a cryptographic key store.

9. The computing device of claim 6 wherein the processor is adapted to process the request by allowing the application access to the store.

10. The computing device of claim 9 wherein the processor is adapted to process the request by carrying out the request.

11. A non-transitory computer-readable medium containing computer-executable instructions that, when performed by a processor in a computing device, cause the processor to:
    receive, from an application, a request for access to a store;
    detect an identity attribute for the application;
    detect a class attribute for the application, wherein the class attribute for the application is associated with a mode of operation of the computing device;
    base a namespace of the application on the identity attribute for the application and the class attribute for the application;
    determine that the application can access the store, wherein to determine that the application can access the store, the instructions cause the processor to determine that the store is in the namespace of the application; and
    process the request based on the determining.

12. The non-transitory computer-readable medium of claim 11 wherein the store comprises a certificate store.

13. The non-transitory computer-readable medium of claim 11 wherein the store comprises a cryptographic key store.

14. The non-transitory computer-readable medium of claim 11 wherein the instructions cause the processor to process the request by allowing the application access to the store.

15. The non-transitory computer-readable medium of claim 14 wherein the instructions cause the processor to process the request by carrying out the request.

* * * * *